United States Patent
Berr et al.

(10) Patent No.: US 10,265,811 B2
(45) Date of Patent: *Apr. 23, 2019

(54) METHOD FOR PRODUCING A PISTON FOR AN INTERNAL COMBUSTION ENGINE AND PISTON PRODUCED BY SAID METHOD

(71) Applicant: Mahle International GmbH, Stuttgart (DE)

(72) Inventors: Gerhard Berr, Aspach (DE); Sascha-Oliver Boczek, Dielheim (DE); Reiner Mueller, Rottweil (DE); Rainer Scharp, Vaihingen (DE)

(73) Assignee: Mahle International GmbH (DE)

( * ) Notice: Subject to any disclaimer, the term of this patent is extended or adjusted under 35 U.S.C. 154(b) by 131 days.

This patent is subject to a terminal disclaimer.

(21) Appl. No.: 14/777,995

(22) PCT Filed: Mar. 18, 2014

(86) PCT No.: PCT/DE2014/000137
§ 371 (c)(1),
(2) Date: Sep. 17, 2015

(87) PCT Pub. No.: WO2014/146635
PCT Pub. Date: Sep. 25, 2014

(65) Prior Publication Data
US 2016/0288275 A1    Oct. 6, 2016

(30) Foreign Application Priority Data

Mar. 18, 2013   (DE) .................. 10 2013 004 576
Aug. 28, 2013   (DE) .................. 10 2013 014 346

(51) Int. Cl.
*B21K 1/18* (2006.01)
*F02F 3/00* (2006.01)
(Continued)

(52) U.S. Cl.
CPC .............. *B23P 15/10* (2013.01); *B21K 1/185* (2013.01); *B23K 35/0255* (2013.01);
(Continued)

(58) Field of Classification Search
CPC ........... B23P 15/10; B21K 1/18; B21K 1/185; B23K 2201/003; B23K 2101/003; F02F 2200/06; F02F 2200/04
See application file for complete search history.

(56) References Cited

U.S. PATENT DOCUMENTS 3,807,014 A    4/1974   Hummel
8,430,070 B2   4/2013   Rebello
(Continued)

FOREIGN PATENT DOCUMENTS

CN   1944994 A    4/2007
DE   2124595 A1   11/1972
(Continued)

OTHER PUBLICATIONS

Machine Translation of JP 61-210220.*
(Continued)

*Primary Examiner* — Christopher J Besler
(74) *Attorney, Agent, or Firm* — Fishman Stewart PLLC

(57) ABSTRACT

A method for producing a piston for an internal combustion engine may include the steps of: producing a piston upper part from a first blank via a deformation process; producing a piston lower part from a second blank via at least one of a deformation process and a casting process; connecting the first blank of the piston upper part and the second blank of the piston lower part to form a piston body via a welding process; and performing at least one of a secondary machining process and a finish machining process of the piston body to produce the piston.

20 Claims, 4 Drawing Sheets

(51) Int. Cl.
*F02F 3/26* (2006.01)
*B23K 35/02* (2006.01)
*B23P 15/10* (2006.01)
*F02B 23/06* (2006.01)
*B23K 101/00* (2006.01)

(52) U.S. Cl.
CPC .......... *F02B 23/0696* (2013.01); *F02F 3/003* (2013.01); *F02F 3/26* (2013.01); *B21K 1/18* (2013.01); *B23B 2215/245* (2013.01); *B23K 2101/003* (2018.08); *F02B 23/0687* (2013.01); *F02F 2003/0061* (2013.01); *F02F 2200/04* (2013.01); *F02F 2200/06* (2013.01); *Y02T 10/125* (2013.01)

(56) References Cited

U.S. PATENT DOCUMENTS

| | | | |
|---|---|---|---|
| 8,528,206 | B2 | 9/2013 | Scharp et al. |
| 8,943,687 | B2 | 2/2015 | Scharp et al. |
| 2005/0028364 | A1* | 2/2005 | Issler ................ B21K 1/18 29/888.042 |
| 2006/0005700 | A1* | 1/2006 | Huang ................ B21K 1/18 92/186 |
| 2007/0079775 | A1* | 4/2007 | Lin .................... F02F 3/003 123/41.35 |
| 2010/0037765 | A1 | 2/2010 | Gniesmer et al. |
| 2010/0319648 | A1* | 12/2010 | Bauer ................ F02F 3/0023 123/193.6 |
| 2012/0222305 | A1 | 9/2012 | Scharp et al. |
| 2012/0260882 | A1* | 10/2012 | Martins ................ B23B 1/00 123/193.6 |

FOREIGN PATENT DOCUMENTS

| | | |
|---|---|---|
| DE | 3040572 A1 | 5/1982 |
| DE | 102005034306 A1 | 5/2006 |
| DE | 102008063947 A1 | 7/2010 |
| DE | 102011013067 A1 | 9/2012 |
| DE | 102011013141 A1 | 9/2012 |
| JP | S61-210220 A | 9/1986 |
| JP | S61210220 | 9/1986 |
| JP | H03-179128 A | 8/1991 |
| JP | H03179128 | 8/1991 |
| JP | 2012-523524 A | 10/2012 |
| JP | 2012-0222305 A | 11/2012 |

OTHER PUBLICATIONS

Chinese Office Action dated Oct. 19, 2016 corresponding to CN 201480014569.1.
English abstract for DE-3040572.
English abstract for DE-102008063947.
Japanese Office Action dated Oct. 3, 2017 corresponding to JP 2016-503540.
English translation of Japanese Office Action dated Oct. 3, 2017 corresponding to JP 2016-503540.
English abstract for JP-2012-0222305.
English abstract for JP-H03-179128.
English translation of Japanese Office Action dated Jun. 5, 2018, for JP 2016-503540.

* cited by examiner

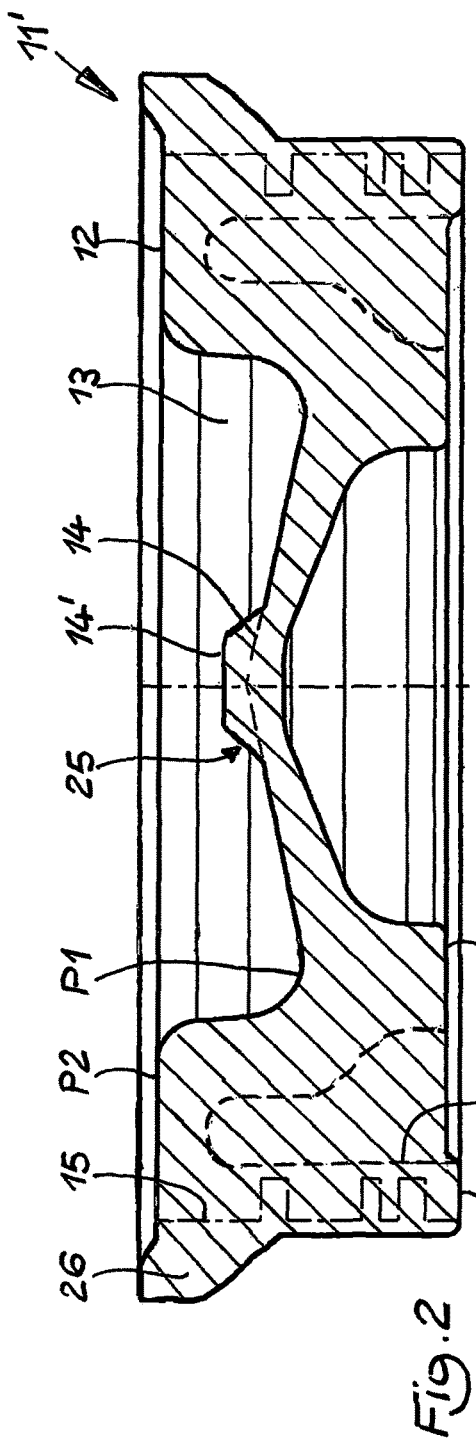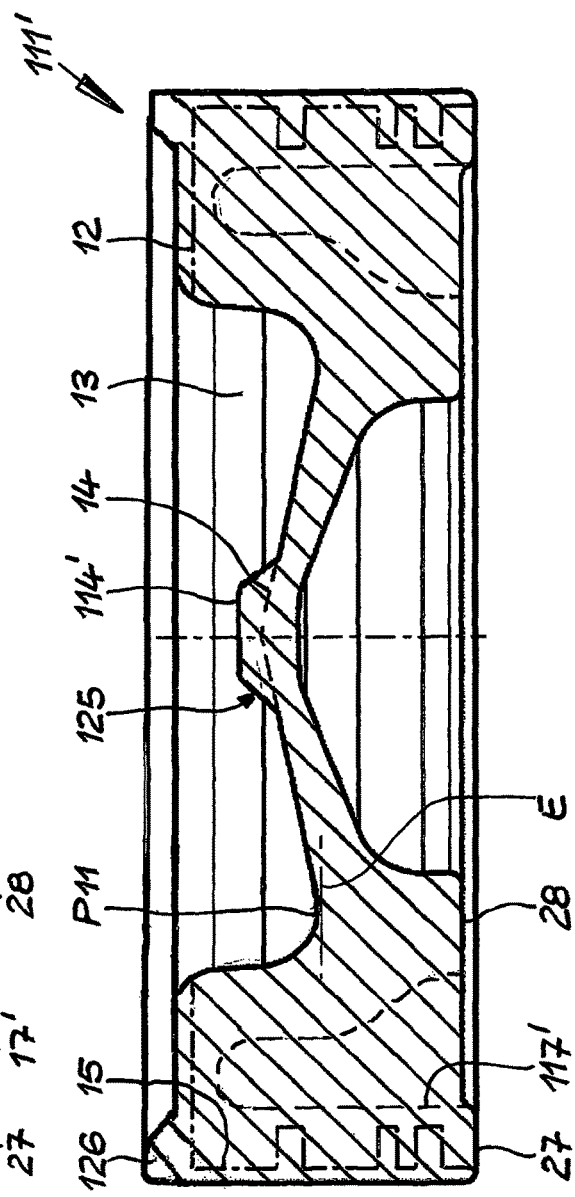
Fig. 2
Fig. 3

METHOD FOR PRODUCING A PISTON FOR AN INTERNAL COMBUSTION ENGINE AND PISTON PRODUCED BY SAID METHOD

CROSS-REFERENCE TO RELATED APPLICATIONS

This application claims priority to German Patent Application No. 10 2013 004 576.2, filed Mar. 18, 2013, German Patent Application No. 10 2013 014 346.2, filed Aug. 28, 2013, and International Patent Application No. PCT/DE2014/000137, filed Mar. 18, 2014, all of which are hereby incorporated by reference in their entirety.

TECHNICAL FIELD

The present invention relates to a method for producing a piston for an internal combustion engine, having a piston upper part and a piston lower part, wherein the piston upper part has a piston crown with a combustion depression with a dome, has an encircling fire land and has an encircling ring section, wherein the piston lower part has piston bosses equipped with boss bores, which piston bosses are connected to one another by way of running surfaces, having the following method steps: a) producing a blank of the piston upper part by way of a deformation process, b) producing a blank of the piston lower part by way of a deformation process or a casting process, c) connecting the blanks of piston upper part and piston lower part to form a piston body by means of a welding process, d) performing secondary machining and/or finish machining of the piston body to form the finished piston. The present invention also relates to a piston producible by way of said method.

BACKGROUND

A generic production method and a piston produced thereby are known from the German patent applications 10 2011 013 141 A1 and DE 10 2011 013 067 A1. According thereto, the blank of the piston upper part is finished by forging in the entire region of the combustion depression, such that the contour of the combustion depression is not involved in the secondary machining process.

It has however been found that the local heating of the piston body during the welding of the blanks results in a change in the microstructure and the dissipation of stresses in the material, which have the effect that the geometry and thus the volume of the combustion depression change. Therefore, the volume of the combustion depression in the finished piston may deviate considerably from the predefined values. Since the combustion depression is finished by forging, additional cutting machining is no longer possible. This applies in particular to combustion depressions with complex geometries.

SUMMARY

It is the object of the present invention to further develop a generic method such that, in as simple a manner as possible, the volume of the combustion depression in the finished piston lies within the predefined tolerance range even in the case of complex geometries.

The solution consists in that, in step a), during the production of the blank of the piston upper part, the contour of the combustion depression outside a dome region is fully produced, excess material is formed in the dome region of the combustion depression, and in that, in step d), such an amount of the excess material in the dome region of the combustion depression is removed as to result in a predetermined volume of the combustion depression.

The present invention also relates to a piston producible by way of the method according to the invention.

The method according to the invention is characterized in that, during the production of the piston upper part by deformation processes, excess material is formed in the region of the dome of the combustion depression, whereas the remaining region of the combustion depression is fully produced, that is to say requires no further secondary machining. Through the removal of a particular amount of the excess material, the predetermined volume of the combustion depression can be accurately set after the welding of the blanks, without the need to manipulate the geometry of the combustion depression outside the region of the dome.

Advantageous refinements will emerge from the subclaims.

Is advantageous if, in step a), if desired, at least one valve niche is fully produced in the piston crown and/or in the piston depression by way of the deformation process, such that secondary machining of the at least one valve niche is also omitted.

In step a), the piston crown can also be fully produced by way of the deformation process, in order that secondary machining of said piston crown is also eliminated. In this case, it is expedient for excess material to additionally be formed in the region of the fire land, as said material can be easily removed in said region, for example by simply being removed by turning. It must merely be ensured that, in the region of the dome of the combustion depression, an adequate amount of excess material is formed in order that the predetermined volume of the combustion depression can be accurately set.

A refinement of the method according to the invention provides that, in step d), for the inspection of the volume of the combustion depression, a reference point at the lowest point of the combustion depression and a reference point at the level of the fully produced piston crown are selected, and thus the present depth of the combustion depression is determined.

Instead, it may be provided that, in step a), excess material is additionally formed in the region of the piston crown. This has the advantage that secondary machining of the piston crown permits flexible setting of the compression height.

A refinement of said method provides that, in step d), for the inspection of the volume of the combustion depression, during the removal of the excess material in the dome region, the present lowest point of the combustion depression is detected, and a plane running perpendicularly to the piston central axis is applied to said lowest point, said plane being used as a starting point for the finish machining of the piston crown.

It is expediently provided that, in steps a) and b), welding surfaces and cooling duct regions are formed into the blanks and are finish-machined. Accurately fitting welding surfaces are required for the welding process in step c). The cooling duct regions are no longer accessible after the welding of the blanks.

It is furthermore advantageous if, between step b) and step c), in the blank of the piston lower part, the interior space is finish-machined and inlet and outlet openings for cooling oil are formed into the cooling duct region. The piston lower part is easier to handle for this purpose than the welded piston body.

Furthermore, based on the same considerations, it is recommended that, between step a) and step c), on the blank of the piston upper part and/or of the piston lower part, the outer diameter be pre-machined, and/or that, on the blank of the piston lower part, the piston bosses be pre-machined.

A preferred refinement provides that, in step d), the boss bores are formed into the piston bosses after the piston crown has been finish-machined. Since the compression height of a piston is defined by the distance between the piston crown and the central axis of the boss bore, the predetermined compression height of the finished piston can be obtained in a particularly simple manner.

Various deformation methods may be selected for the production of the blank of the piston upper part. The blank may be forged by hot working at 1200° C. to 1300° C. and subsequently subjected to cold calibration. The blank may also be forged by hot working at 1200° C. to 1300° C. and subsequently subjected to cold working at a temperature of at most 150° C. The blank may furthermore be forged by warm working at 600° C. to 900° C. Furthermore, the blank may, after the warm working, be subjected to cold working at a temperature of at most 150° C. Finally, the blank may be forged by cold working at at most 150° C.

It is expediently provided that, in step c), the blanks are connected to one another by way of a friction welding process. The use of a friction welding process is however not imperative.

BRIEF DESCRIPTION OF THE DRAWINGS

Exemplary embodiments of the present invention will be discussed in more detail below on the basis of the appended drawings in which, in each case in a schematic illustration which is not to scale:

FIG. 2 shows a first exemplary embodiment of a blank of a piston upper part for a piston as per FIG. 1;

FIG. 3 shows a second exemplary embodiment of a blank of a piston upper part for a piston as per FIG. 1;

DETAILED DESCRIPTION

Figure 1:
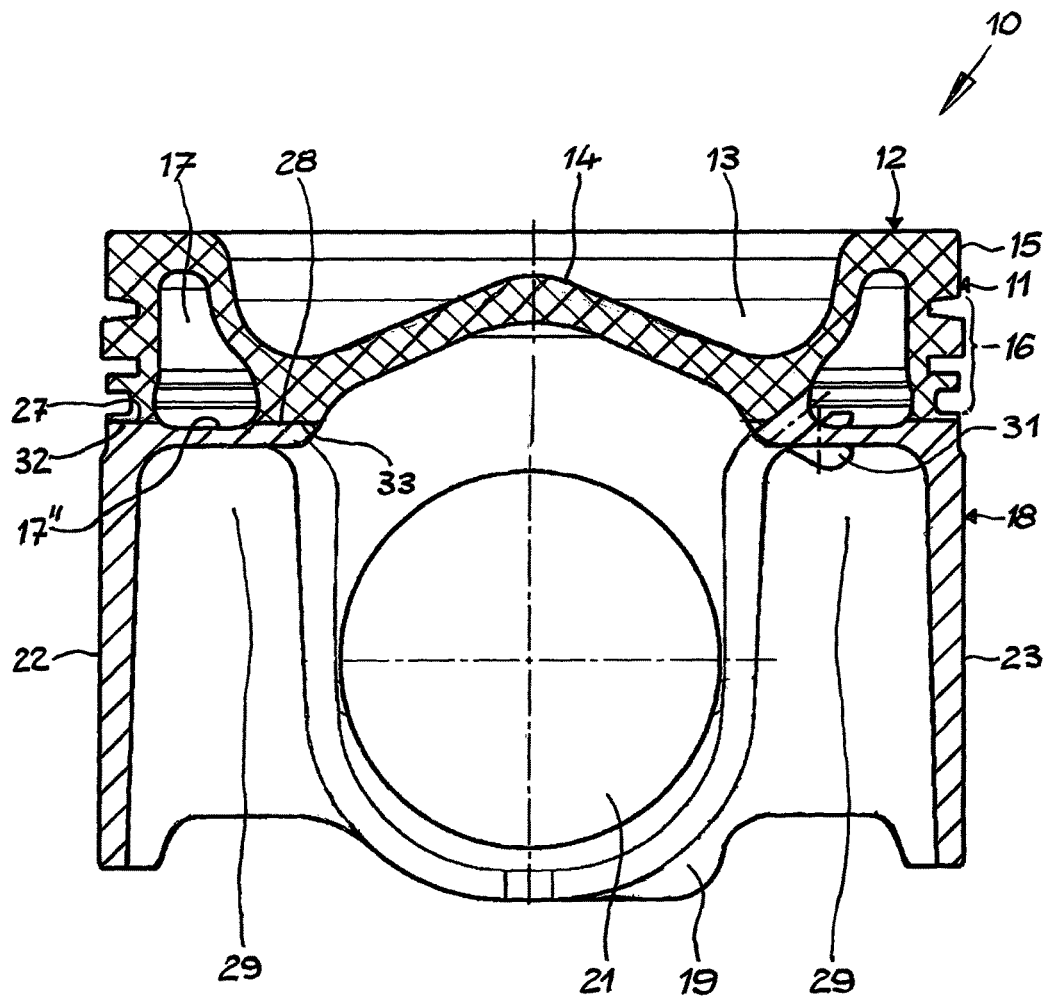
FIG. 1 shows an exemplary embodiment of a piston produced by way of the method according to the invention.

FIG. 1 shows an exemplary embodiment of a piston 10 according to the invention. The piston 10 has a piston upper part 11 with a piston crown 12. In the piston crown 12 there is provided a combustion depression 13 which has a central dome 14. The piston upper part 11 furthermore has an encircling fire land 15 and an encircling ring section 16 with annular grooves for receiving piston rings (not illustrated). An encircling cooling duct 17 is provided at the level of the ring section 16.

The piston 10 furthermore has a piston lower part 18 with piston bosses 19 and boss bores 21 for receiving a piston pin (not illustrated). The piston bosses 19 are connected to one another by way of running surfaces 22, 23.

In the present exemplary embodiment, the piston upper part 11 and the piston lower part 18 are connected to one another by way of a friction welding process.

The piston upper part 11 is produced from a material which can be subjected to a deformation process. This is typically a tempering steel, for example 42CrMo4 or an AFP steel such as 38MnVS6.

Figure 5:
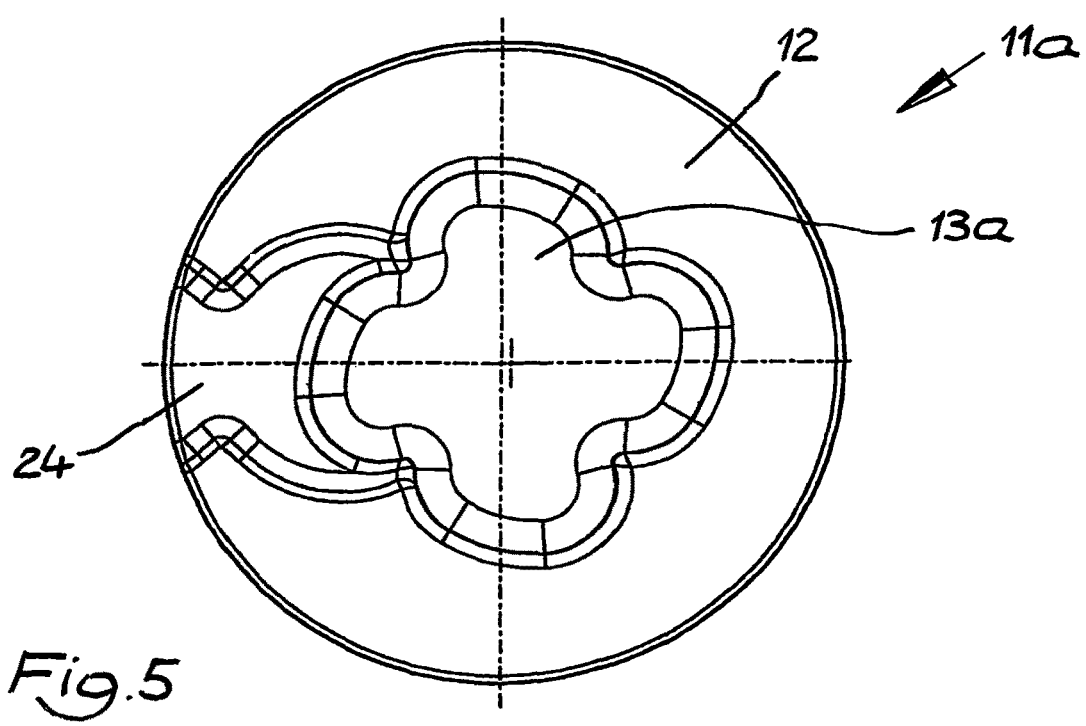
FIG. 5 shows an exemplary embodiment of a combustion depression with valve niche for a piston as per FIG. 1.

According to the invention, it is the intention to produce a piston 10 whose combustion depression 13 has a volume within a predetermined tolerance range. It is the intention to achieve this aim regardless of the geometry of the combustion depression, such that even a combustion depression of complex geometry, such as is illustrated for example in FIG. 5, has a volume within the predetermined tolerance range after the completion of the production process. FIG. 5 shows a plan view of a combustion depression 13a in a piston upper part IIa. The combustion depression 13a has a cloverleaf-shaped contour. A valve niche 24 is additionally formed into the piston crown 12. It is the intention that, by means of the method according to the invention, the aim according to the invention can be achieved even for combustion depressions which are radially offset with respect to the piston central axis or which are in an inclined arrangement.

For this purpose, a blank for the piston upper part 11 is firstly produced by deformation. A first exemplary embodiment of a blank 11' of said type is illustrated in FIG. 2. The blank 11' has, in the exemplary embodiment, been forged by warm working at 600° to 900° and subsequent cold working at at most 150° C. The blank 11' is illustrated in section by hatching, whereas the final contours of the piston upper part 11 in the finished piston 10 are indicated by dash-dotted lines. In the exemplary embodiment, the geometry of the combustion depression 13, with the exception of the dome region 14' around the dome 14, and the piston crown 12 are finished by forging. This means that, for the production of the finished piston 10, no secondary machining of the piston crown 12 and of the combustion depression 13 is necessary, other than in the dome region 14'.

It is essential that, after the forging process, the dome region 14' has an adequate amount of excess material 25 in order that the volume of the combustion depression can be accurately set in accordance with the invention (in this regard, see further below). Further excess material 26 that is not required for the setting of the volume of the combustion depression 13 may be formed outside the piston crown 12 in the region of what will later become the fire land 15.

After the forging process, the outer diameter of the blank 11' may be pre-machined, wherein in particular, the excess material 26 may be removed. Furthermore, a cooling duct region 17', which in the finished piston 10 forms a part of the cooling duct 17, is formed into the blank 11'. The cooling duct region 17' may also be formed in during the forging process, and in this case is finish-machined after the forging process. Finally, after the forging process, the welding surfaces 27, 28, by way of which the blank 11' is to be connected to the blank of the piston lower part 18 (cf. FIG. 1), are finish-machined.

A blank of the piston lower part 18 may be produced from any suitable material by deformation or casting. In a manner known per se, the outer diameter and the hub region of the blank may be pre-machined. Furthermore, the interior space 29 and a cooling duct region 17", which in the finished piston 10 forms a part of the cooling duct 17, are finish-machined. Inlet and outlet openings 31 for cooling oil are formed into the cooling duct region 17", (cf. FIG. 1). Finally, after the forging process, the welding surfaces 32, 33, by way of which the blank 11' is to be connected to the blank of the piston upper part 11 (cf. FIG. 1), are finish-machined.

Then, the blanks are, by way of their welding surfaces 27, 28, 32, 33, connected to one another in a manner known per se by way of a friction welding process. In this case, the friction welding process leads to local heating of the material in the region of the welding surfaces 27, 28, 32, 33. Said local heating effects a change in the microstructure, and the dissipation of stresses, in the material. This generally has the effect that the geometry and thus the volume of the combustion depression 13 then deviate considerably from the values predefined for the finished piston (10).

Then, in a subsequent method step, on the piston body that results from the welding process, the dome region 14' is finish-machined by virtue of the excess material being removed. This is performed to such an extent that, as a result, the predetermined volume is accurately set after the welding of the blanks, without the need to manipulate the geometry of the combustion depression 13 outside the dome region 14'. The remaining region of the combustion depression has already been fully produced by way of the deformation process, that is to say requires no further secondary machining.

During said process, the volume of the combustion depression 13 is inspected. For this purpose, a reference point P1 at the lowest point of the combustion depression 13 and a reference point P2 at the height of the fully produced piston crown 12 are selected. The present depth of the combustion depression 13 is thus determined. If, for example, the depth of the combustion depression 13 lies at the upper tolerance limit, the machining in the dome region 14' must lie substantially at the lower tolerance limit, such that, as a result, the actual volume of the combustion depression 13 lies as close as possible to the middle of the tolerance range of the predetermined volume.

To complete the method according to the invention, the piston body is finish-machined by virtue, for example, of the final fine contour being produced and the annular grooves being formed into the ring section 16 and the boss bores 21 being formed into the piston boss 19. The boss bores 21 are formed in such that the predetermined compression height of the finished piston is determined by the central axis of said boss bores in relation to the piston crown 12. A piston as per FIG. 1 is obtained as a result.

A second exemplary embodiment of a blank 111' of said type for a piston upper part 11 is illustrated in FIG. 3. In the exemplary embodiment, the blank 111' has been forged by hot working at 1200° to 1300° and has subsequently been further processed by cold calibration (pressing of the upper surfaces of the blank 111' at room temperature). The blank 111' is illustrated in section by way of hatching, whereas the final contours of the piston upper part 11 in the finished piston 10 are indicated by dash-dotted lines. In the exemplary embodiment, the geometry of the combustion depression 13, with the exception of the dome region 114' around the dome 14, is finished by forging. This means that, for the production of the finished piston 10, no secondary machining of the combustion depression 13 is necessary, other than in the dome region 114'.

It is essential that, after the forging process, the dome region 114' has an adequate amount of excess material 125 in order that the volume of the combustion depression can be accurately set in accordance with the invention (in this regard, see further below). Further excess material 126 that is not required for the setting of the volume of the combustion depression 13 may be formed outside the piston crown 12 in the region of what will later become the piston crown.

After the forging process, the outer diameter of the blank 111' may be pre-machined. Furthermore, a cooling duct region 117', which in the finished piston 10 forms a part of the cooling duct 17, is formed into the blank 111'. The cooling duct region 117' may also be formed in during the forging process, and in this case is finish-machined after the forging process. Finally, after the forging process, the welding surfaces 127, 128, by way of which the blank 111' is to be connected to the blank of the piston lower part 18 (cf. FIG. 1), are finish-machined.

The blank 111' is, as described above, connected together, in a manner known per se, with a blank for a piston main body 18, by way of the welding surfaces 27, 28, 32, 33 of said blanks (cf. FIG. 1). In this case, the friction welding process leads to local heating of the material in the region of the welding surfaces 27, 28, 32, 33. Said local heating effects a change in the microstructure, and the dissipation of stresses, in the material. This generally has the effect that the geometry and thus the volume of the combustion depression 13 then deviate considerably from the values predefined for the finished piston 10.

Then, in a subsequent method step, on the piston body that results from the welding process, the dome region 114' is finish-machined by virtue of the excess material 125 being removed. This is performed to such an extent that, as a result, the predetermined volume is accurately set after the welding of the blanks, without the need to manipulate the geometry of the combustion depression 13 outside the dome region 114'. The remaining region of the combustion depression has already been fully produced by way of the deformation process, that is to say requires no further secondary machining.

For the inspection of the volume of the combustion depression (13), during the removal of the excess material 125 in the dome region 114', the present lowest point P11 of the combustion depression 13 is detected, and a plane E running perpendicularly to the piston central axis is applied to said lowest point, said plane being used as a starting point for the finish machining of the piston crown 12 (cf. FIG. 3).

To complete the method according to the invention, the piston body is finish-machined by virtue, for example, of the final fine contour being produced and the annular grooves being formed into the ring section 16 and the boss bores 21 being formed into the piston boss 19. Furthermore, the piston crown 12 is finish-machined by virtue of the excess material 126 being removed. The boss bores 21 are subsequently formed in such that the predetermined compression height of the finished piston is determined by the central axis of said boss bores in relation to the piston crown 12. In this case, the distance between the piston crown 12 and central axis of the boss bores 21 can be varied by way of the amount of material removed. A piston as per FIG. 1 is obtained as a result.

Figure 4:
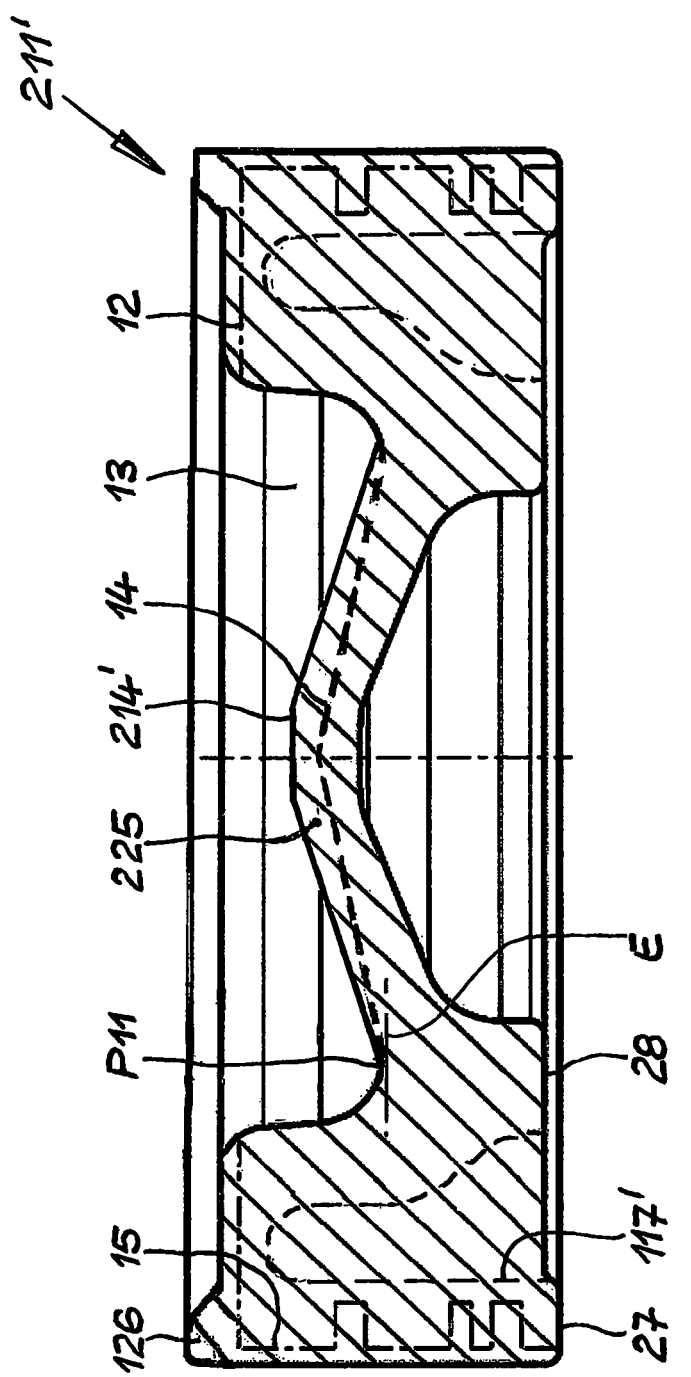
FIG. 4 shows a third exemplary embodiment of a blank of a piston upper part for a piston as per FIG. 1.

A third exemplary embodiment of a blank 211' of said type for a piston upper part 11 is illustrated in FIG. 4. The blank 211' substantially corresponds to the blank 111 as per FIG. 3, such that the same reference signs are used for common structures, and in this regard, reference is made to the description relating to FIG. 3. The blank 211' is illustrated in section by way of hatching, whereas the final contours of the piston upper part 11 in the finished piston 10 are indicated by dash-dotted lines. In the exemplary embodiment, the geometry of the combustion depression 13, with the exception of the dome region 214', is finished by forging. The dome region 214' extends from the tip of the dome 14 to the lowest point P11 of the combustion depression 13. This means that, for the production of the finished piston 10, no secondary machining of the combustion depression 13 is necessary, other than in the dome region 214'.

It is essential that, after the forging process, the dome region 214' has an adequate amount of excess material 225 in order that the volume of the combustion depression can be accurately set in accordance with the invention (in this regard, see further below). Further excess material 126 that is not required for the setting of the volume of the combustion depression 13 may be formed in the region of what will later become the piston crown 12.

In the case of the production method described for the exemplary embodiment as per FIG. 3, on the piston body that results from the welding process, the dome region 214' is finish-machined by virtue of the excess material 225 being removed. This is performed to such an extent that, as a result, the predetermined volume is accurately set after the welding of the blanks, without the need to manipulate the geometry of the combustion depression 13 outside the dome region 214'. The remaining region of the combustion depression has already been fully produced by way of the deformation process, that is to say requires no further secondary machining.

For the inspection of the volume of the combustion depression (13), during the removal of the excess material 225 in the dome region 214', the present lowest point P11 of the combustion depression 13 is detected, and a plane E running perpendicularly to the piston central axis is applied to said lowest point, said plane being used as a starting point for the finish machining of the piston crown 12 (cf. FIG. 4).

The finish machining is performed as described for the exemplary embodiment as per FIG. 3. A piston as per FIG. 1 is obtained as a result.

The invention claimed is:

1. A method for producing a piston for an internal combustion engine, comprising the steps of:
   a) producing a first blank for a piston upper part via a forging process, wherein the piston upper part includes a piston crown, an annular fire land, and an annular ring section, and wherein the piston crown has a combustion depression defining a dome,
   b) producing a second blank for a piston lower part via at least one of a deformation process and a casting process, the piston lower part including a plurality of piston bosses connected to one another via a running surface and together defining at least two boss bores,
   c) connecting the first blank for the piston upper part and the second blank for the piston lower part to form a piston body via a welding process, and
   d) performing at least one of a secondary machining process and a finish machining process on the piston body to produce a finished piston including the piston lower part and the piston upper part after step c) of connecting the first blank for the piston upper part and the second blank for the piston lower part via the welding process;
   wherein during step a), a contour of the combustion depression outside of a dome region of the combustion depression is formed to completion and an excess material deposit is disposed in the dome region of the combustion depression, and wherein step d) further includes removing an amount of the excess material deposit in the dome region of the combustion depression to define a predetermined volume of the combustion depression without performing the at least one of the secondary machining process and the finish machining process on the contour of the combustion depression outside of the dome region.

2. The method as claimed in claim 1, wherein step a) further includes forming at least one valve niche in at least one of the piston crown and the combustion depression.

3. The method as claimed in claim 1, wherein step a) further includes a formation of an additional excess material deposit in a region of the fire land.

4. The method as claimed in claim 3, wherein step a) further includes forming the piston crown outside of the dome region to completion.

5. The method as claimed in claim 1, wherein step a) further includes a formation of an additional excess material deposit in a region of the piston crown.

6. The method as claimed in claim 5, wherein step d) further includes inspecting a volume of the combustion depression during the removal of the excess material deposit in the dome region, wherein inspecting the volume includes determining a lowest point of the combustion depression, and establishing a starting point for a finish machining process of the piston crown based on a plane running perpendicularly to a piston central axis and extending through lowest point.

7. The method as claimed in claim 1, wherein at least one of step a) further includes forming at least one first welding surface and a first cooling duct region into the first blank, and finish-machining at least one of the at least one first welding surface and the first cooling duct region; and
   step b) further includes forming at least one second welding surface and a second cooling duct region into the second blank, and finish-machining at least one of the at least one second welding surface and the second cooling region.

8. The method as claimed in claim 1, wherein between step b) and step c), further including performing a finish-machining process on an interior space defined by the second blank for the piston lower part and forming an inlet opening and an outlet opening for a cooling fluid into a cooling duct region disposed in the second blank.

9. The method as claimed in claim 1, wherein between step a) and step c), further including at least one of (i) pre-machining an outer diameter of at least one of the first blank for the piston upper part and the second blank for the piston lower part, and (ii) pre-machining the plurality of piston bosses of the second blank.

10. The method as claimed in claim 1, wherein step d) further includes forming the at least two boss bores into the plurality of piston bosses after performing the finish-machining process to at least the piston crown.

11. The method as claimed in claim 1, wherein the forging process of step a) includes forging the first blank for the piston upper part via a hot working process at a temperature ranging from 1200° C. to 1300° C.

12. The method as claimed in claim 11, wherein step a) further includes performing a cold working process to the first blank at a temperature of 150° C. or less after forging the first blank.

13. The method as claimed in claim 1, wherein step d) of removing the amount of excess material deposit in the dome region includes forming the combustion depression asymmetrical with respect to a piston central axis.

14. The method as claimed in claim 1, wherein step d) of removing the amount of excess material deposit in the dome region includes providing the combustion depression with a defined geometry.

15. The method as claimed in claim 14, wherein providing the combustion depression with the defined geometry includes forming the combustion depression radially offset with respect to a piston central axis.

16. The method as claimed in claim 15, wherein providing the combustion depression with the defined geometry includes forming the combustion depression inclined with respect to a piston central axis.

17. The method as claimed in claim 4, wherein step d) further includes selecting a first reference point at a lowest point of the combustion depression and a second reference point at a high point of the piston crown for inspecting the predetermined volume of the combustion depression, and determining an actual depth of the combustion depression in response to the first reference point and the second reference point.

18. The method as claimed in claim 11, wherein step a) further includes performing a cold calibration process to the first blank after forging the first blank.

19. The method as claimed in claim 5, wherein step d) further includes removing an amount of the additional excess material deposit in the region of the piston crown after the piston body is formed by connecting the first blank for the piston upper part and the second blank for the piston lower part via the welding process in step c), wherein the piston crown is disposed radially between the combustion depression and the annular fire land with respect to a piston central axis.

20. The method as claimed in claim 1, wherein step c) further includes friction welding a welding surface of the first blank to a welding surface of the second blank to form the piston body such that the combustion depression has an initial volume that is less than the predetermined volume.

\* \* \* \* \*